United States Patent
Morioka

(10) Patent No.: US 7,639,990 B2
(45) Date of Patent: Dec. 29, 2009

(54) WIRELESS COMMUNICATIONS DEVICE

(75) Inventor: Katsuhiko Morioka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 503 days.

(21) Appl. No.: 11/435,893

(22) Filed: May 18, 2006

(65) Prior Publication Data
US 2006/0264182 A1 Nov. 23, 2006

(30) Foreign Application Priority Data
May 18, 2005 (JP) .............................. 2005-145448

(51) Int. Cl.
*H04B 1/44* (2006.01)
(52) U.S. Cl. ...................................... 455/78; 455/127.1
(58) Field of Classification Search .................... 455/73, 455/78, 84, 86, 550.1, 552.1, 103, 127.1, 455/127.2; 330/124 R, 285, 295
See application file for complete search history.

(56) References Cited

U.S. PATENT DOCUMENTS

| 6,567,653 | B1 | 5/2003 | Sanders |
| 7,155,251 | B2 * | 12/2006 | Saruwatari et al. ....... 455/552.1 |
| 2007/0004343 | A1 * | 1/2007 | Kandola et al. ............... 455/73 |

FOREIGN PATENT DOCUMENTS

| JP | 2004-526337 A | 8/2004 |
| WO | WO 01/80436 A1 | 10/2001 |

* cited by examiner

*Primary Examiner*—Thanh C Le
(74) *Attorney, Agent, or Firm*—McDermott Will & Emery LLP

(57) ABSTRACT

A wireless communications device comprises a common amplifier for amplifying a plurality of high-frequency signals of different communications systems, a plurality of signal channels provided subsequent to the common amplifier, each of the plurality of high-frequency signals being passed through the respective signal channels, and a switch circuit provided between the plurality of signal channels and the common amplifier, for connecting the common amplifier and one of the plurality of signal channels. Each of the plurality of signal channels is provided with a power amplifier having power amplification efficiency optimal with respect to a high-frequency signal passed through the signal channel.

12 Claims, 7 Drawing Sheets

WIRELESS COMMUNICATIONS DEVICE

CROSS REFERENCE TO RELATED APPLICATION

This Non-provisional application claims priority under 35 U.S.C. §119(a) on Patent Application No. 2005-145448 filed in Japan on May 18, 2005, the entire contents of which are hereby incorporated by reference.

BACKGROUND OF THE INVENTION

1. Field of the Invention

The present invention relates to a wireless communications device which can be used in common to different communications systems.

2. Description of the Related Art

In recent years, a plurality of communications systems are used in the field of mobile communications, such as representatively mobile telephone services. For example, in Japan, the Personal Digital Cellular (PDC) system employing Time Division Multiple Access (TDMA) and the Code Division Multiple Access (CDMA) system are mainly used. In other countries, GSM (Global System for Mobile Communications) employing TDMA and UMTS (Universal Mobile Telecommunications System) employing CDMA are used. To establish compatibility between these different coexisting communications systems, various techniques have been proposed.

Conventionally, in dual-mode communications devices (or transmitters) which can be used in common to two different communications systems, when one of the communications systems is being selected, the device is generally not operated in the other communications system. Most of the dual-mode communications devices select the systems by changing paths through which a signal is transferred, using a switch or the like.

Hereinafter, an exemplary wireless communications device will be described with reference to FIG. 7, in which communication is performed, switching between an full-duplex analog mode in which transmission and reception are simultaneously performed as in the CDMA technology, and a half-duplex digital mode in which transmission and reception are alternately performed as in the TDMA technology (see, for example, WO01/80436).

FIG. 7 illustrates a block configuration of a conventional dual-mode wireless communications device. As illustrated in FIG. 7, the conventional wireless communications device comprises a transmitter 110 which generates a transmit signal, a receiver 120 which processes a received signal, an antenna assembly 130 which is connected to the transmitter 110 and the receiver 120, and a controller 140 which controls the transmitter 110 and the antenna assembly 130.

The transmitter 110 includes a high frequency amplifier 111 which modulates and amplifies input transmit data to generate a transmit signal. The high frequency amplifier 111 is controlled in accordance with a gain control signal from the controller 140. An operating state, a gain, or the like of the high frequency amplifier 111 are changed between an analog mode and a digital mode, thereby generating a transmit signal different between the analog mode and the digital mode.

The transmit signal output from the high frequency amplifier 111 is input to a common terminal A of a first path select switch 131 (single-pole double-throw switch) provided in the antenna assembly 130. The first path select switch 131 is switched in accordance with a switch control signal from the controller 140 so that continuity is established between the common terminal A and a terminal B in the analog mode, and between the common terminal A and a terminal C in the digital mode.

The terminal C of the first path select switch 131 is connected to a terminal F of a the second path select switch 132 (single-pole double-throw switch) which is switched in association with the first path select switch 131. In an operation in the digital mode, there is continuity between the terminal F of the second path select switch 132 and a common terminal D to which an antenna 134. Therefore, in the case of the digital mode, a transmit signal input to the common terminal A of the first path select switch 131 is transferred via the terminal C of the first path select switch 131 and the terminal F of the second path select switch 132 to the antenna 134 connected to the common terminal D of the second path select switch 132, and is transmitted from the antenna 134.

In an operation in the analog mode, the common terminal A of the first path select switch 131 is connected to the terminal B, and the common terminal D of the second path select switch 132 is connected to a terminal E, in accordance with a switch control signal from the controller 140. The terminal B of the first path select switch 131 is connected to a transmit signal input terminal of a duplexer 133, and the terminal E of the second path select switch 132 is connected to an antenna terminal of the duplexer 133. Therefore, in the case of the analog mode, a transmit signal input to the common terminal A of the first path select switch 131 is output via the duplexer 133 from the antenna 134.

Also in the case of the analog mode, a receive signal is received through the antenna 134 at the same time when a transmit signal is transmitted. The received signal is transferred via the common terminal D and the terminal E of the second path select switch 132 into the antenna terminal of the duplexer 133. The duplexer 133 extracts a required frequency from the received signal, separates the frequency signal from a transmit signal, and outputs the frequency signal through a received signal output terminal of the duplexer 133. The received signal output from the duplexer 133 is demodulated by an amplifier/demodulator 121 provided in the receiver 120, and the resultant signal is output as received data.

As described above, by switching the first path select switch 131 and the second path select switch 132 in accordance with a control signal from the controller 140, a signal channel including the duplexer 133 is selected in the case of the analog mode (full-duplex, i.e., a simultaneous transmission and reception operation), and a signal channel not including the duplexer 133 is selected in the case of the digital mode (half-duplex, i.e., an alternate transmission and reception operation).

Also, by controlling an operating point of the high frequency amplifier 111 in accordance with a gain control signal from the controller 140, the high frequency amplifier 111 is nonlinearly operated in the analog mode, and the high frequency amplifier 111 is linearly or quasi-linearly operated in the digital mode. Further, a gain of the high frequency amplifier 111 is adjusted in accordance with the gain control signal so as to prevent a power difference from occurring in a signal to be transmitted through the antenna 134, depending on the presence or absence of the duplexer 133.

However, the conventional exemplary wireless communications device has the following problems.

Firstly, the high frequency amplifier 111 is nonlinearly operated in the analog mode, and the high frequency amplifier 111 is linearly or quasi-linearly operated in the digital mode, so that it is difficult to maximize the power efficiency of the high frequency amplifier 111 in both the modes, i.e., the power efficiency of the high frequency amplifier 111 decreases in at least one of the modes.

Next, in the analog mode, a transmit signal from the high frequency amplifier 111 is attenuated when the transmit signal is passed through the duplexer 133. When an optimal size of the high frequency amplifier 111 is designed, taking into consideration the attenuation of a transmit signal in the duplexer 133, the power efficiency decreases in a digital mode in which there is not the attenuation of the transmit signal due to the duplexer 133.

Further, in a digital mode in which an amplitude-modulated component is included in a transmit signal, since the linearity of the high frequency amplifier 111 is important in terms of the characteristics of the modulation technique, the high frequency amplifier 111 needs to be operated in a region slightly below a saturated power point, so that the power efficiency further decreases.

In addition, not only when an analog mode and a digital mode coexist, but also when there are different digital modes, since required transmit power varies among the modes, it is considerably difficult to operate the high frequency amplifier 111 with maximum efficiency in all the modes.

SUMMARY OF THE INVENTION

An object of the present invention is to solve the above-described conventional problems, and achieve a wireless communications device which can support two or more communications systems having different required operating characteristics of an amplifier, transmit power, and the like, and can enable the amplifier to operate with maximum power efficiency in any of the communications systems.

To achieve the object, the present invention provides a wireless communications device which supports a plurality of communications systems and is configured to switch power amplifiers between each communications system.

Specifically, a first wireless communications device according to the present invention comprising a common amplifier for amplifying a plurality of high-frequency signals of different communications systems, a plurality of signal channels provided subsequent to the common amplifier, each of the plurality of high-frequency signals being passed through the respective signal channels, and each of the plurality of signal channels having a power amplifier having power amplification efficiency optimal with respect to a high-frequency signal passed through the signal channel, and a switch circuit provided between the plurality of signal channels and the common amplifier, for connecting the common amplifier and one of the plurality of signal channels.

According to the first wireless communications device, power amplification can be performed with optimal efficiency in any of the communications systems, thereby making it possible to reduce power loss in the power amplifier, and therefore, achieve a wireless communications device which saves power and can be used for a long time. Also, it is possible to suppress heat generation of the wireless communications device, and suppress degradation due to heat of the power amplifier.

Preferably, the first wireless communications device further comprises an antenna for outputting each of the plurality of high-frequency signals, and an antenna select circuit provided between the antenna and the plurality of signal channels, for connecting the antenna and one of the plurality of signal channels. With this configuration, the antenna can be used in common, thereby making it possible to further save space.

In the first wireless communications device, preferably, the plurality of high-frequency signals include a high-frequency signal of a modulation system employing a Time Division Multiple Access (TDMA) technology and a high-frequency signal of a modulation system employing a Code Division Multiple Access (CDMA) technology.

In the first wireless communications device, preferably, the power amplifiers include a power amplifier for performing a linear or quasi-linear operation, and a power amplifier for performing a nonlinear operation.

In the first wireless communications device, preferably, the switch circuit is composed of a semiconductor element. With this configuration, isolation between each signal channel can be improved while suppressing insertion loss of the switch circuit.

Preferably, the first wireless communications device further comprises a control circuit for causing a power amplifier provided in a signal channel selected by the switch circuit among the plurality of signal channels to be in an ON state, and causes the other power amplifiers to be in an OFF state. With this configuration, power consumption of a non-selected power amplifier is reduced, thereby making it possible to further save power. Also, isolation between each signal channel can be improved.

In the first wireless communications device, preferably, the switch circuit is a transmission line having a branch portion and connecting an output terminal of the common amplifier and an input terminal of each power amplifier, and a resonance line is provided between the branch portion of the transmission line and the input terminal of each power amplifier, and has a length which allows resonance with a frequency of a high-frequency signal amplified by the power amplifier. Alternatively, the switch circuit may be a transmission line having a branch portion and connecting an output terminal of the common amplifier and an input terminal of each power amplifier, and an open stub may be formed between the branch portion of the transmission line and the input terminal of each power amplifier by a distributed constant circuit, the open stub having an infinite impedance with respect to high-frequency signals excluding a high-frequency signal amplified by the power amplifier. With this configuration, the switch circuit can be simplified.

In the first wireless communications device, preferably, the control circuit is a circuit for supplying a bias to each power amplifier.

The first wireless communications device further comprises a detecting circuit provided preceding the common amplifier, for extracting a phase-modulated signal by separating an amplitude-modulated component from a high-frequency signal. The power amplifier is an EER (Envelope Elimination and Reconstruction) amplifier for remodulating the phase-modulated signal based on the amplitude-modulated component. With this configuration, a nonlinear amplifier can be used as the power amplifier, thereby making it possible to the power efficiency of the power amplifier.

In the first wireless communications device, the common amplifier is an EER amplifier for remodulating the phase-modulated signal based on the amplitude-modulated component. With this configuration, the common amplifier can also be caused to perform amplitude modulation, thereby making it possible to accurately control a level of a high-frequency signal input to each signal channel. Also, the common amplifier can also be caused to perform a nonlinear operation, thereby making it possible to improve power efficiency.

Preferably, the first wireless communications device further comprises a local transmitter provided preceding the detecting circuit, for generating a local signal, and a phase modulator for performing phase modulation with respect to the local signal.

A second wireless communications device according to the present invention comprises a common amplifier for amplifying a plurality of high-frequency signals having different transmit power levels, a plurality of signal channels provided subsequent to the common amplifier, each of the plurality of high-frequency signals being passed through the respective signal channels, and a switch circuit provided between the plurality of signal channels and the common amplifier, for connecting the common amplifier and one of the plurality of signal channels. The common amplifier is a circuit for amplifying a first high-frequency signal having a lowest transmit power level of the plurality of high-frequency signals up to the transmit power level of the first high-frequency signal, and the plurality of signal channels excluding a signal channel through which the first high-frequency signal is passed are provided with a power amplifier having power amplification efficiency optimal with respect to a high-frequency signal passed through the signal channel.

According to the second wireless communications device, one power amplifier can be removed. Therefore, the power consumption of the wireless communications device can be reduced, thereby making it possible to reduce the size.

In the second wireless communications device, preferably, the plurality of high-frequency signals include a high-frequency signal of a modulation system employing a time division multiple access technology and a high-frequency signal of a modulation system employing a code division multiple access technology.

Preferably, the second wireless communications device further comprises a detecting circuit provided preceding the common amplifier, for extracting a phase-modulated signal by separating an amplitude-modulated component from each of the plurality of high-frequency signals. The common amplifier and the power amplifier are each an EER amplifier for remodulating the phase-modulated signal based on the amplitude-modulated component.

DETAILED DESCRIPTION OF THE PREFFERED EMBODYMENTS

First Embodiment

Figure 1:
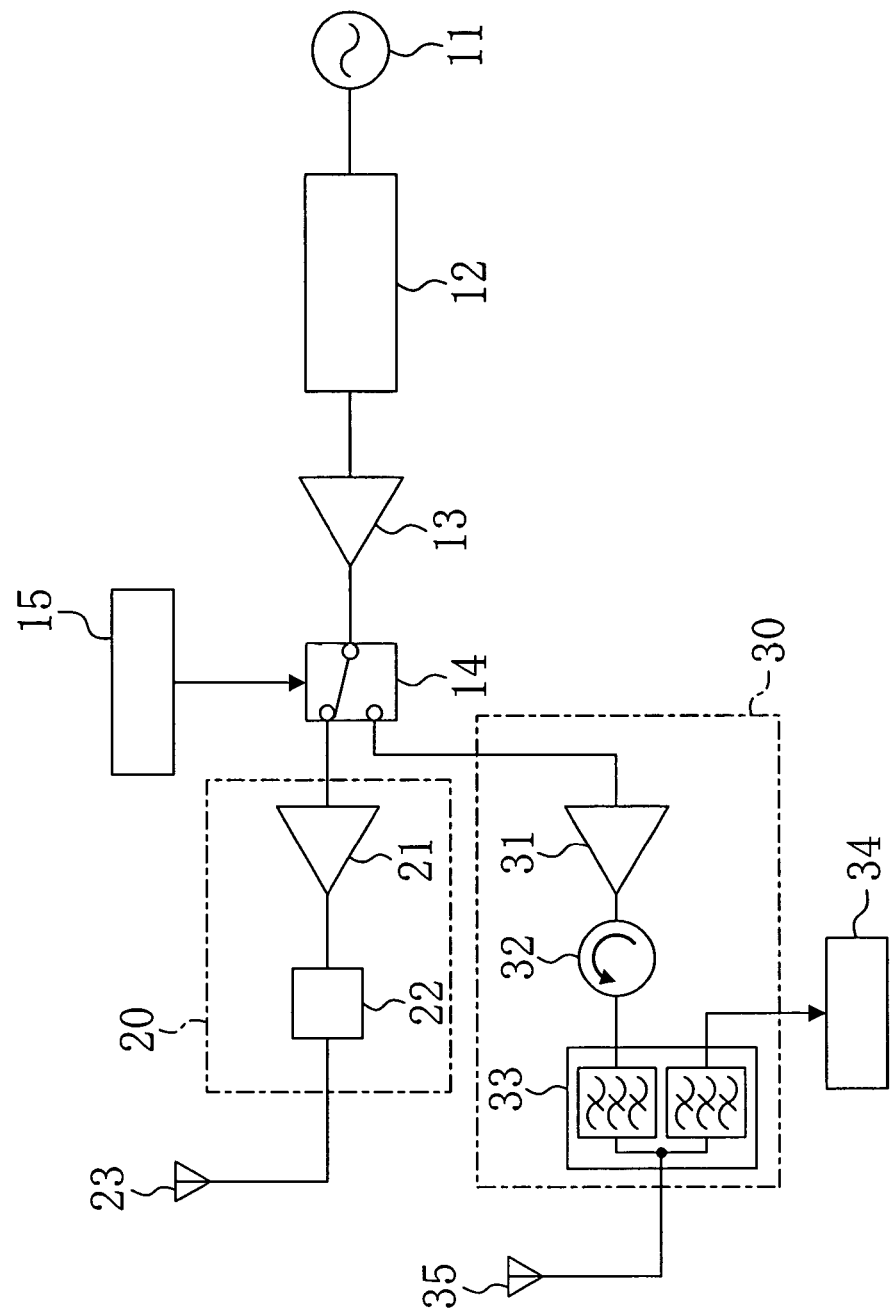
FIG. 1 is a block diagram illustrating a wireless communications device according to a first embodiment of the present invention.

A wireless communications device according to a first embodiment of the present invention will be described with reference to FIG. 1. FIG. 1 illustrates a block configuration of the wireless communications device of the first embodiment.

As illustrated in FIG. 1, the wireless communications device of this embodiment is a dual-mode wireless communications device which supports two different communications systems. The two communications systems are herein, but not limited to, GSM (a type of TDMA system) and UMTS (a type of CDMA system) for the sake of convenience.

The wireless communications device of this embodiment comprises a frequency generator 11 which generates an oscillating signal having a predetermined frequency, a modulator 12 which modulates the oscillating signal generated by the frequency generator 11, and a preamplifier 13 which amplifies the high-frequency signal modulated by the modulator 12. The modulator 12 can generate either a high-frequency signal of a GSM mode or a high-frequency signal of an UMTS mode. The preamplifier 13 is an amplifier which amplifies a high-frequency signal in common to the GSM mode and the UMTS mode.

An output terminal of the preamplifier 13 is connected to a path select switch 14. The path select switch 14 is controlled by a controller 15 so that a GSM signal channel 20 is selected in the case of the GSM mode, and an UMTS signal channel 30 is selected in the case of the UMTS mode. The path select switch 14 is a switch composed of a transistor, and can secure a sufficient level of isolation from a non-selected signal channel.

The GSM signal channel 20 is composed of a GSM power amplifier 21, and a low-pass filter 22 which is connected to an output terminal of the GSM power amplifier 21. The GSM power amplifier 21 is an amplifier which performs nonlinear amplification required in the GSM mode, and is set to exhibit maximum power efficiency in terms of transmit power required in the GSM mode.

The low-pass filter 22 is provided so as to suppress a harmonic component which is generated when power amplification is performed by the GSM power amplifier 21 (non-linear amplifier). An output terminal of the low-pass filter 22 is connected to a GSM antenna 23.

The UMTS signal channel 30 is composed of an UMTS power amplifier 31, an isolator 32 which is connected to an output terminal of the UMTS power amplifier 31, and a duplexer 33 which has two input/output terminals, one of which is connected to an output terminal of the isolator 32. The UMTS power amplifier 31 is an amplifier which performs linear or quasi-linear amplification which is required in the UMTS mode, and is set to exhibit maximum power efficiency in terms of transmit power required in the UMTS mode.

The isolator 32 is provided so as to absorb reflected wave to stabilize an operation of the UMTS power amplifier 31. The duplexer 33 is provided so as to separate transmission and reception frequency bands to simultaneously perform transmission and reception. An UMTS antenna 35 is connected to an antenna terminal of the duplexer 33, and the other input/output terminal of the duplexer 33 is connected to a receiver 34.

The GSM mode requires a transmit power larger than that of the UMTS mode. A transmit power in Power Class 4 which is most widely used among Power Classes which are defined in GSM 11.10-1 Version 8.2.0 which is a GSM standard of EN 300 607-1 of European Telecommunications Standards Institute (ETSI), is +33 dBm. On the other hand, a transmit power in Power Class 3 which is most widely used among Power Classes which are defined in GPP TS 25.101 V6.5.0 which is an UMTS standard, is +24 dBm. Therefore, a power difference between the GSM mode and the UMTS mode is as large as 9 dB.

Typically, when the power difference is large, it is difficult to operate the amplifier under conditions which comply with power conditions set in each mode and allow maximum power efficiency. However, according to the wireless communications device of the first embodiment, the two signal channels are provided, and the two power amplifiers whose characteristics are optimized to meet requirements in the GSM mode and the UMTS mode, respectively, are provided, and therefore, the power amplifiers can be operated with maximum power efficiency in the respective modes.

Although the path select switch 14 for changing the two signal channels needs to be inserted into the circuit, a matching level between the preamplifier 13, and the GSM power amplifier 21 and the UMTS power amplifier 31 is improved due to insertion loss caused by the path select switch 14. The insertion loss of the path select switch 14 is considerably small, which will be understood, taking into consideration a total of amplified amounts of the wireless communications device, and that the path select switch 14 is provided in an input stage of the power amplifier 21, and therefore, has substantially no influence on the power consumption of the whole wireless communications device.

Also, there is a distance constraint to a layout arrangement of the preamplifier 13, and the GSM power amplifier 21 and the UMTS power amplifier 31. Thereby, for example, when the preamplifier 13, the GSM power amplifier 21, and the UMTS power amplifier 31 are each composed of a Microwave Monolithic Integrated Circuit (MMIC), and the packaging density of the blocks is relatively high, heat transfer from the preamplifier 13 to the GSM power amplifier 21 and the UMTS power amplifier 31 can be suppressed. As a result, it is possible to suppress thermal runaway, and breakdown due to heat generation, of the GSM power amplifier 21 and the UMTS power amplifier 31, thereby making it possible to achieve a more reliable wireless communications device.

Although it has been described in this embodiment that a frequency of the oscillating signal generated by the frequency generator 11 is directly a transmit frequency (direct modulation technique), the frequency of the oscillating signal generated by the frequency generator 11 may be converted using, for example, a mixer or the like before modulation.

In this embodiment, a wireless communications device is operated in a dual mode including a GSM mode and an UMTS mode. A similar configuration can be provided with respect to other modes. Also, a wireless communications device which is operated in three or more coexisting modes can be provided.

Second Embodiment

Figure 2:
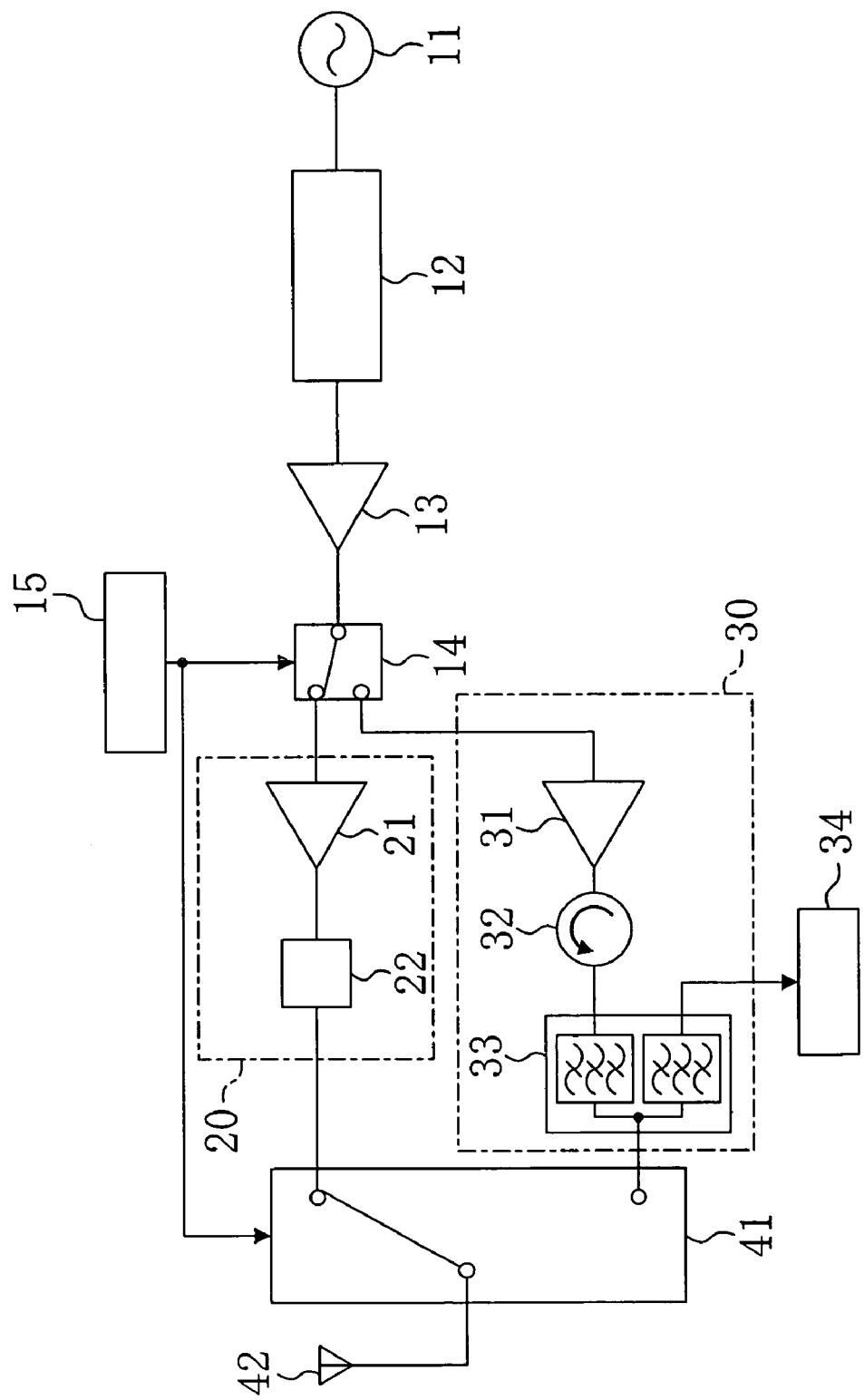
FIG. 2 is a block diagram illustrating a wireless communications device according to a second embodiment of the present invention.

Hereinafter, a wireless communications device according to a second embodiment of the present invention will be described with reference to FIG. 2. FIG. 2 illustrates a block configuration of the wireless communications device of the second embodiment. In FIG. 2, the same components as those of FIG. 1 are referenced with the same reference numerals and will not be described.

In the wireless communications device of this embodiment, the output terminal of the GSM signal channel 20 and the output terminal of the UMTS signal channel 30 are connected to respective input/output terminals of an antenna switch 41. A common antenna 42 is connected to an antenna terminal of the antenna switch 41. The single antenna is used, switching between a GSM mode and an UMTS mode.

The antenna switch 41 is controlled by the controller 15 as with the path select switch 14 so that a signal channel selected by the path select switch 14 is connected to the common antenna 42.

According to the wireless communications device of the second embodiment, a single antenna can be used in common to the GSM mode and the UMTS mode. Further, if a switch having excellent isolation capability is used as the antenna switch 41, isolation of the GSM signal channel 20 and the UMTS signal channel 30 can be improved, thereby making it possible to suppress interference between the GSM mode and the UMTS mode.

Third Embodiment

Figure 3:
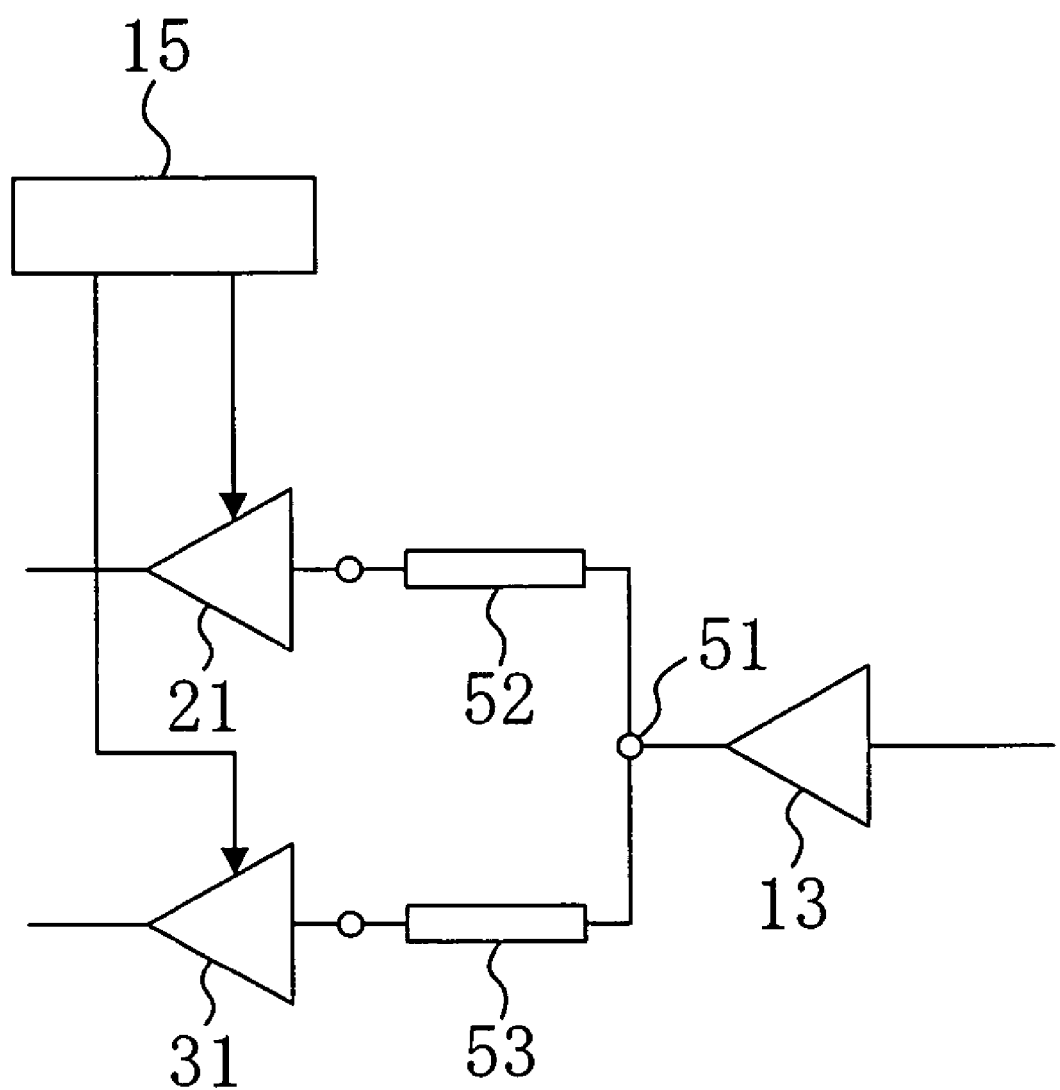
FIG. 3 is a block diagram illustrating a wireless communications device according to a third embodiment of the present invention.

Hereinafter, a wireless communications device according to a third embodiment of the present invention will be described with reference to FIG. 3. FIG. 3 illustrates a block configuration of a portion of the wireless communications device of the third embodiment. In FIG. 3, the same components as those of FIG. 1 are referenced with the same reference numerals and will not be described.

In the wireless communications device of this embodiment, a GSM signal channel and an UMTS signal channel are changed using two resonance lines instead of the path select switch 14.

An output line from the preamplifier 13 which is used in common to a GSM mode and an UMTS mode, is divided into two at a branch point 51. One of the two branches is connected via a first resonance line 52 to an input terminal of the GSM power amplifier 21 provided on the GSM signal channel 20. The other branch is connected via a second resonance line 53 to an input terminal of the UMTS power amplifier 31 provided on the UMTS signal channel 30.

The first resonance line 52 is set to have a length from the branch point 51 to the input terminal of the GSM power amplifier 21, which tunes to a frequency of the GSM mode. The second resonance line 53 is set to have a length from the branch point 51 to the input terminal of the UMTS power amplifier 31, which tunes to a frequency of the UMTS mode. When the GSM mode and the UMTS mode have the same frequency, the first resonance line 52 and the second resonance line 53 have the same length.

In the third embodiment, the controller 15 controls ON/OFF of each of the GSM power amplifier 21 and the UMTS power amplifier 31. Specifically, in the GSM mode, the GSM power amplifier 21 is in the ON state and the UMTS power amplifier 31 is in the OFF state. In the UMTS mode, the GSM power amplifier 21 is in the OFF state and the UMTS power amplifier 31 is in the ON state.

For example, in the case of the GSM mode, although a signal is transferred via the first resonance line 52 to the ON-state GSM power amplifier 21, the second resonance line 53 connected to the OFF-state UMTS power amplifier 31 becomes an open stub having an infinite impedance, so that a signal is not transferred to the UMTS signal channel 30. Thus, the signal channels can be selected using a considerably simple configuration.

In this embodiment, the first resonance line and the second resonance line are formed using transmission lines having physical line lengths which tune to frequencies which are passed therethrough. Alternatively, the first resonance line and the second resonance line may be formed using distributed constants of passive elements or parts other than passive elements. Also, an antenna may be used in common as in the second embodiment.

Fourth Embodiment

Figure 4:
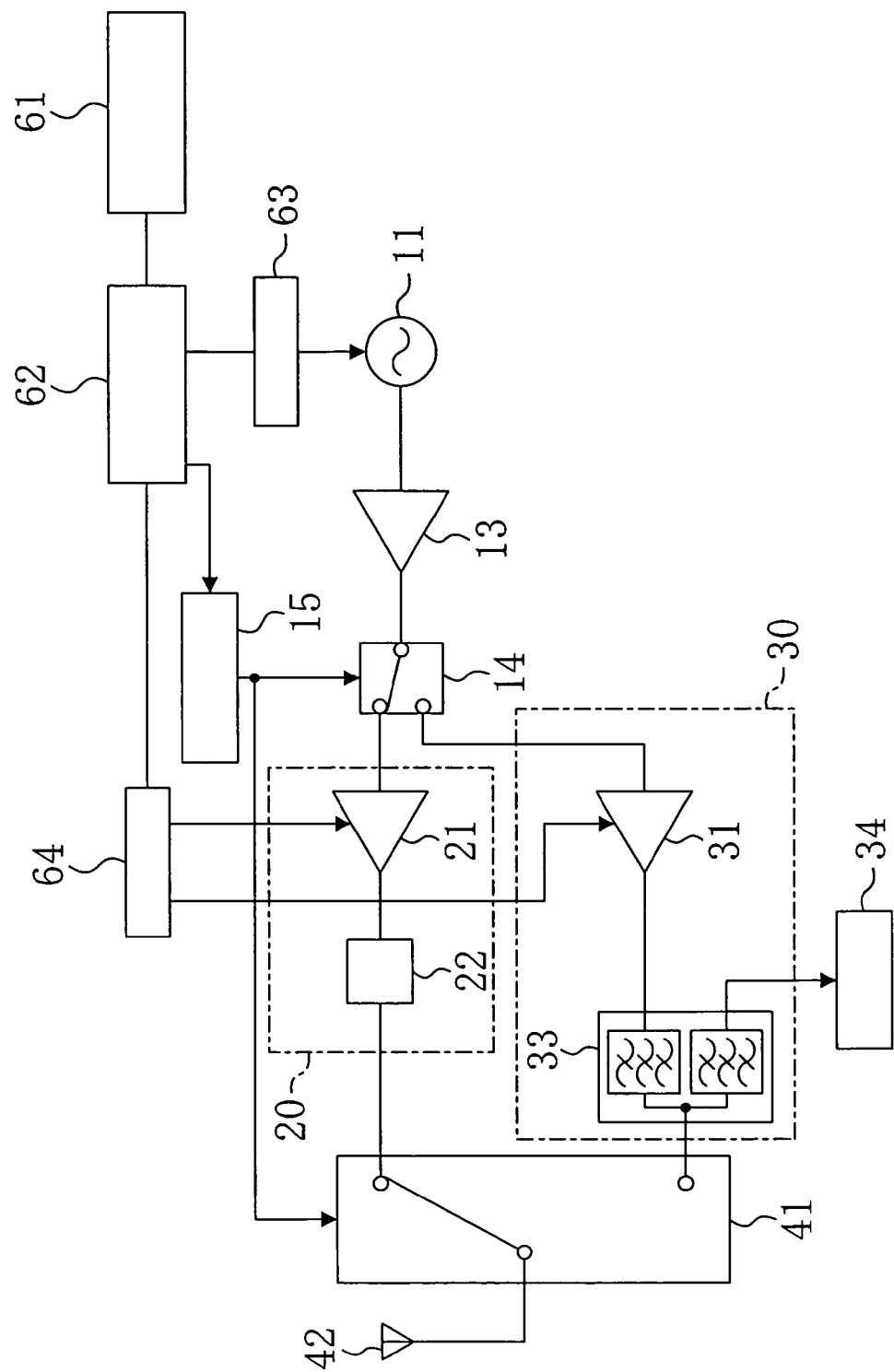
FIG. 4 is a block diagram illustrating a wireless communications device according to a fourth embodiment of the present invention.

Hereinafter, a wireless communications device according to a fourth embodiment of the present invention will be described with reference to FIG. 4. FIG. 4 illustrates a block configuration of the wireless communications device of the fourth embodiment. In FIG. 4, the same components as those of FIG. 2 are referenced with the same reference numerals and will not be described.

In the wireless communications device of the fourth embodiment, the GSM power amplifier 21 and the UMTS power amplifier 31 are each composed of an EER (Envelope Elimination and Reconstruction) amplifier. An AM controller 64 for performing amplitude modulation with respect to the EER amplifier, and a PM controller 63 for performing phase modulation with respect to the frequency generator 11 are provided.

A modulation signal generated by a modulation signal generator 61 is converted from a signal in a rectangular coordinate system into a signal in a polar coordinate system by the polar controller 62, and is separated into a PM signal having phase information and an AM signal having amplitude information. The separated PM signal is used for phase modulation with respect to the frequency generator 11 by the PM controller 63. Similarly, the AM signal is used for amplitude modulation with respect to the GSM power amplifier 21 and the UMTS power amplifier 31 (EER amplifiers) by the AM controller 64. A phase-modulated oscillating signal from the frequency generator 11 is amplified by the preamplifier 13, and thereafter, the resultant signal is input via the path select switch 14 to the GSM signal channel 20 or the UMTS signal channel 30.

The controller 15 which controls the path select switch 14 is controlled in accordance with a signal from the polar controller 62. Therefore, when one of the GSM mode and the UMTS mode is selected in the polar controller 62, a signal channel corresponding to the selected mode is selected by the path select switch 14.

When the GSM signal channel 20 is selected, EER amplification and amplitude modulation operation are simultaneously performed in the GSM power amplifier 21 in accordance with a control signal from the AM controller 64. The GSM power amplifier 21 is set to perform nonlinear amplification so that maximum power efficiency is obtained with respect to a transmit power required for the GSM mode.

Similarly, when the UMTS signal channel 30 is selected, EER amplification and amplitude modulation are simultaneously performed in the UMTS power amplifier 31 in accordance with a control signal from the AM controller 64. The UMTS power amplifier 31 is set to perform nonlinear amplification so that maximum power efficiency is obtained with respect to a transmit power required for the UMTS mode. Thus, by providing an ERR amplifier as a power amplifier, it is possible to perform nonlinear amplification even in the UMTS mode where an amplitude-modulated component is included in a modulated signal, so that power efficiency can be significantly increased as compared to when linear or quasi-linear amplification is performed.

Note that the path select switch 14 may be formed using a resonance line and the like as in the third embodiment.

Fifth Embodiment

Figure 5:
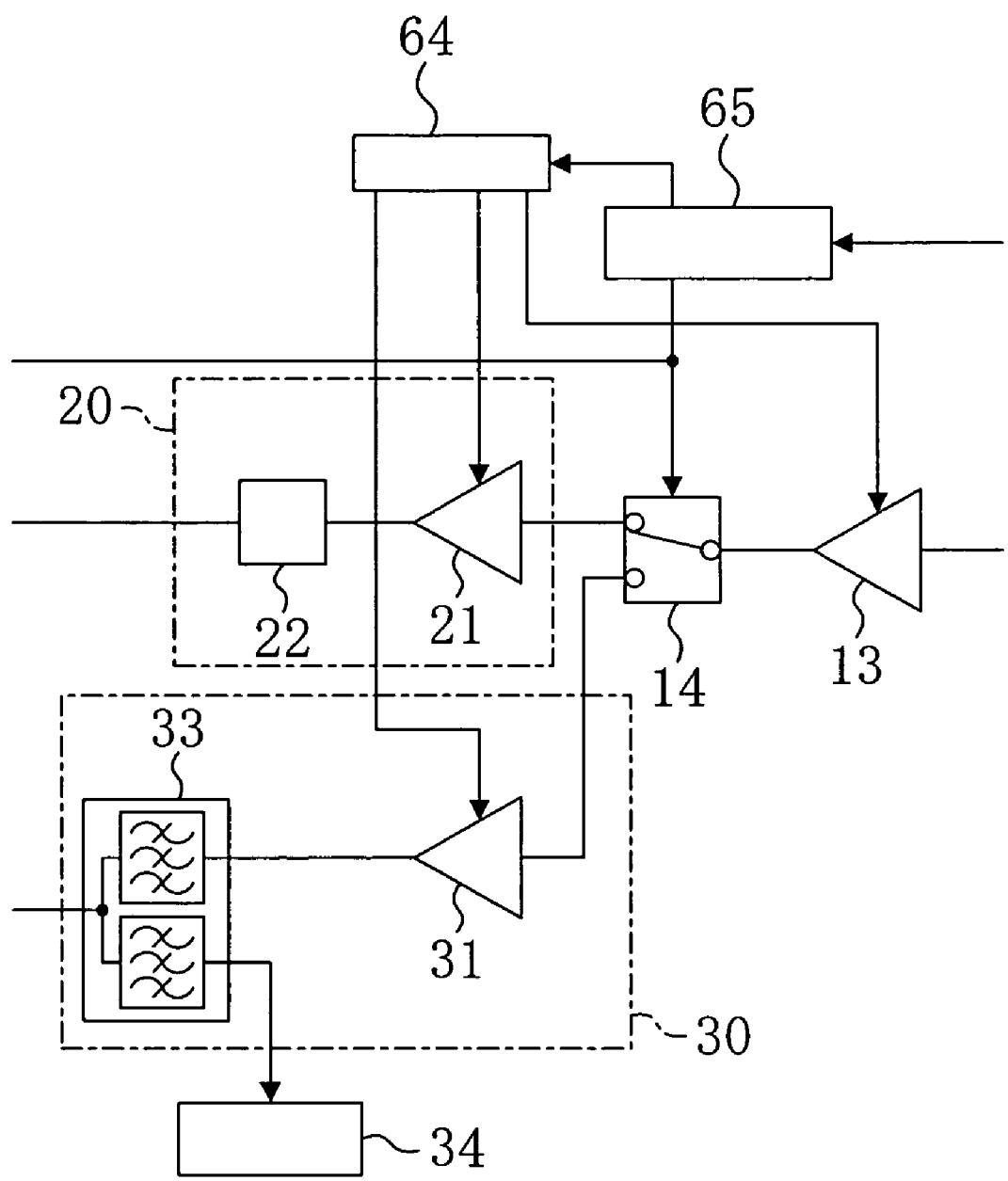
FIG. 5 is a block diagram illustrating a wireless communications device according to a fifth embodiment of the present invention.

Hereinafter, a wireless communications device according to a fifth embodiment of the present invention will be described with reference to FIG. 5. FIG. 5 illustrates a block configuration of a portion of the wireless communications device of the fifth embodiment. In FIG. 5, the same components as those of FIG. 4 are referenced with the same reference numerals and will not be described.

As illustrated in FIG. 5, in the wireless communications device of this embodiment, the preamplifier 13 is also an ERR amplifier, and amplitude modulation is also performed with respect to the preamplifier 13.

Thereby, a level of a signal input to each of the GSM power amplifier 21 and the UMTS power amplifier 31 can be accurately controlled, depending on the selected mode.

Also, since the preamplifier 13 is enabled to perform a nonlinear operation, maximum power efficiency can be obtained in all operating modes included in the wireless communications device. As a result, a wireless communications device which can be operated for a long time can be achieved.

In this embodiment, the path select switch 14 and the AM controller 64 are controlled together by a controller 65 which is obtained by integrating the controller 15 and the polar controller 62 together. Alternatively, the controller 15 and the polar controller 62 may be separated from each other as in the fourth embodiment.

Sixth Embodiment

Figure 6:
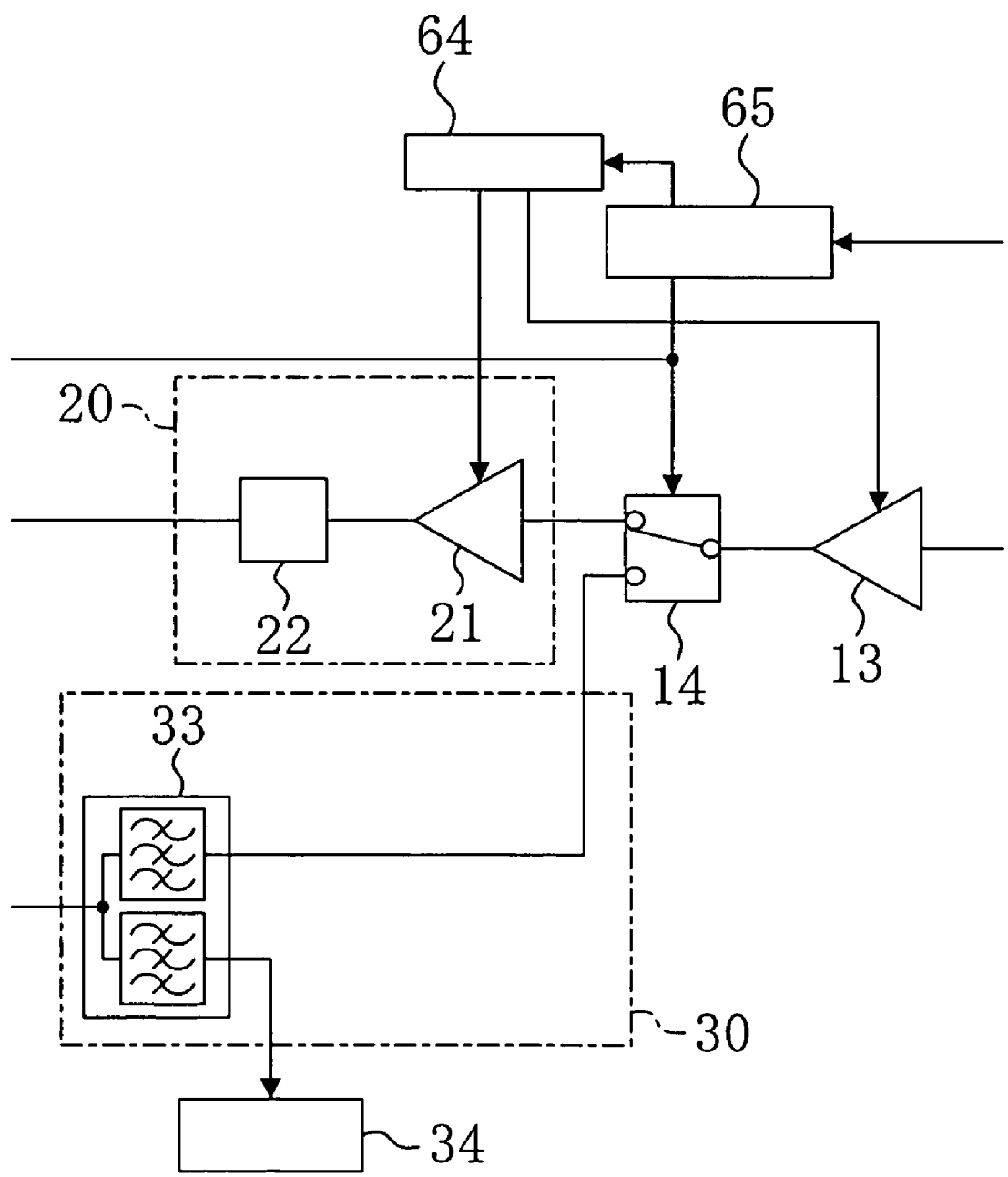
FIG. 6 is a block diagram illustrating a wireless communications device according to a sixth embodiment of the present invention.
Figure 7:
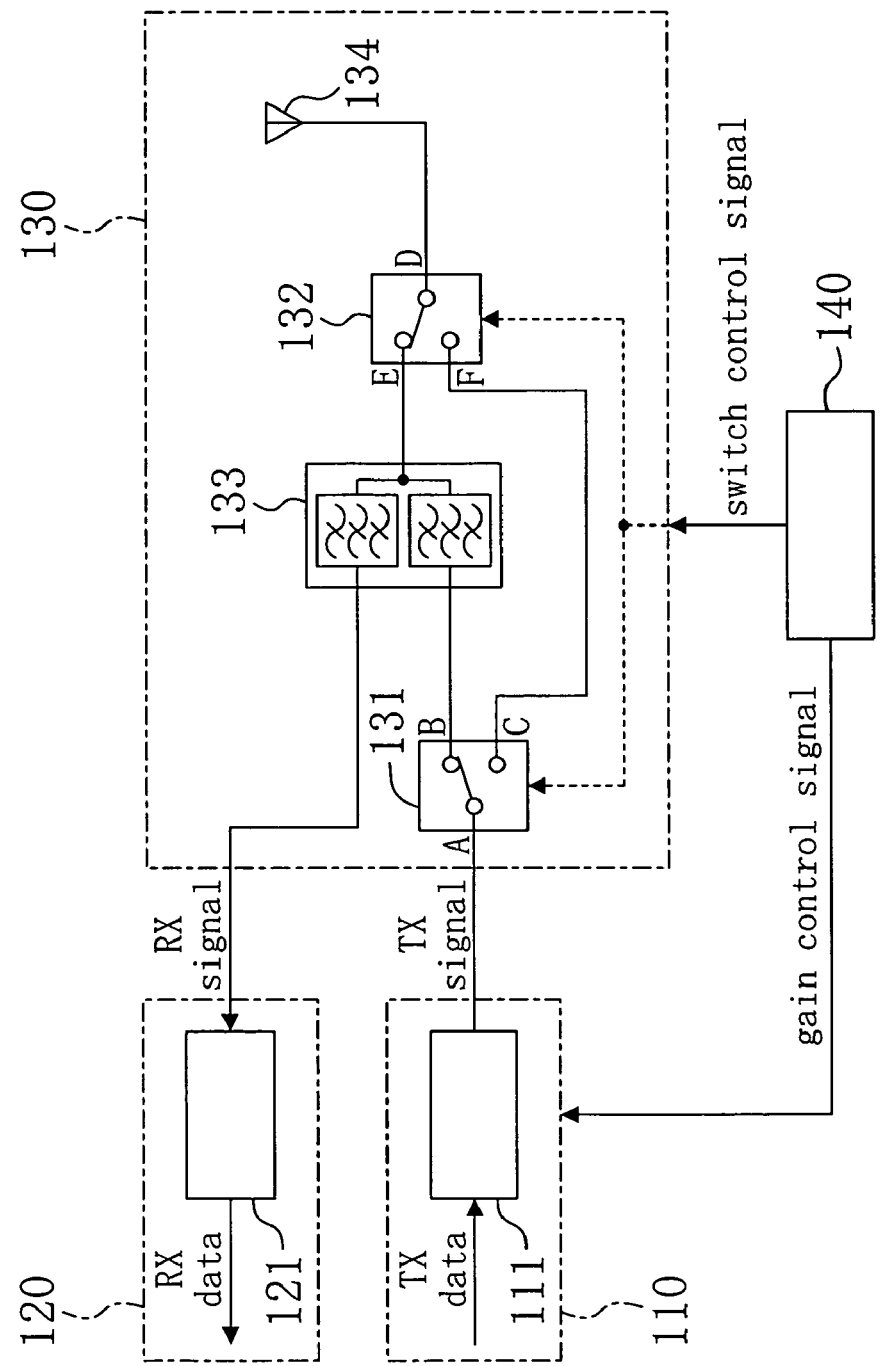
FIG. 7 is a block diagram illustrating a wireless communications device according to a conventional example.

Hereinafter, a wireless communications device according to a sixth embodiment of the present invention will be described with reference to FIG. 6. FIG. 6 illustrates a block configuration of a portion of the wireless communications device of the sixth embodiment. In FIG. 6, the same components as those of FIG. 5 are referenced with the same reference numerals and will not be described.

As illustrated in FIG. 6, in the wireless communications device of this embodiment, a power amplifier is not provided in the UMTS signal channel 30. In the UMTS mode which has a transmit power lower than that of the GSM mode, amplification is performed up to a required transmit power level by the preamplifier 13. Thereby, the UMTS power amplifier 31 can be removed, thereby making it possible to reduce power consumption and space of the wireless communications device.

Also, in the GSM mode, the GSM power amplifier 21 is set to achieve optimal power efficiency in the whole amplifier configuration including the GSM power amplifier 21 and the preamplifier 13.

As described above, the wireless communications device of the present invention can support two or more communications systems having different required operating characteristics of an amplifier, transmit power, and the like, and can enable the amplifier to operate with maximum power efficiency in any of the communications systems. The present invention is useful for, for example, a wireless communications device which can be employed in different communications systems.

What is claimed is:

1. A wireless communications device comprising:
a common amplifier for amplifying a plurality of high-frequency signals of different communications systems;
a plurality of signal channels provided subsequent to the common amplifier, each of the plurality of high-frequency signals being passed through the respective signal channels, and each of the plurality of signal channels having a power amplifier having power amplification efficiency optimal with respect to a high-frequency signal passed through the signal channel;
a switch circuit provided between the plurality of signal channels and the common amplifier, for connecting the common amplifier and one of the plurality of signal channels,
a common antenna for outputting each of the plurality of high-frequency signals;
an antenna switch circuit provided between the common antenna and the plurality of signal channels, for connecting the common antenna and one of the plurality of signal channels;
a control circuit for controlling the switch circuit and the antenna switch circuit; and
a detecting circuit provided preceding the common amplifier, for extracting a phase-modulated signal by separating an amplitude-modulated component from each of the plurality of high-frequency signals,
wherein the power amplifier is an EER amplifier for remodulating the phase-modulated signal based on the amplitude-modulated component.

2. The wireless communications device of claim 1, wherein the plurality of high-frequency signals include a high-frequency signal of a modulation system employing a time division multiple access technology and a high-frequency signal of a modulation system employing a code division multiple access technology.

3. The wireless communications device of claim 1, wherein the power amplifiers include a power amplifier for performing a linear or quasi-linear operation, and a power amplifier for performing a nonlinear operation.

4. The wireless communications device of claim 1, wherein the switch circuit is composed of a semiconductor element.

5. The wireless communications device of claim 1, further comprising:
a control circuit for causing a power amplifier provided in a signal channel selected by the switch circuit among the plurality of signal channels to be in an ON state, and causes power amplifiers provided in the other signal channels to be in an OFF state.

6. The wireless communications device of claim 5, wherein:
the switch circuit is a transmission line having a branch portion and connecting an output terminal of the common amplifier and an input terminal of each power amplifier; and
a resonance line is provided between the branch portion of the transmission line and the input terminal of each power amplifier, and has a length which allows resonance with a frequency of a high-frequency signal amplified by the power amplifier.

7. The wireless communications device of claim 5, wherein:
the switch circuit is a transmission line having a branch portion and connecting an output terminal of the common amplifier and an input terminal of each power amplifier; and
an open stub is formed between the branch portion of the transmission line and the input terminal of each power amplifier by a distributed constant circuit, the open stub having an infinite impedance with respect to high-frequency signals excluding a high-frequency signal amplified by the power amplifier.

8. The wireless communications device of claim 5, wherein the control circuit is a circuit for supplying a bias to each power amplifier.

9. The wireless communications device of claim 1, wherein the common amplifier is an EER amplifier for remodulating the phase-modulated signal based on the amplitude-modulated component.

10. The wireless communications device of claim 1, further comprising:
a local transmitter provided preceding the detecting circuit, for generating a local signal; and
a phase modulator for performing phase modulation with respect to the local signal.

11. A wireless communications device comprising:
a common amplifier for amplifying a plurality of high-frequency signals having different transmit power levels;
a plurality of signal channels provided subsequent to the common amplifier, each of the plurality of high-frequency signals being passed through the respective signal channels;
a switch circuit provided between the plurality of signal channels and the common amplifier, for connecting the common amplifier and one of the plurality of signal channels;
a common antenna for outputting each of the plurality of high-frequency signals;
an antenna switch circuit provided between the common antenna and the plurality of signal channels, for connecting the common antenna and one of the plurality of signal channels;
a control circuit for controlling the switch circuit and the antenna switch circuit; and
a detecting circuit provided preceding the common amplifier, for extracting a phase-modulated signal by separating an amplitude-modulated component from each of the plurality of high-frequency signals,
wherein the common amplifier is a power amplifying circuit for amplifying a first high-frequency signal having a lowest transmit power level of the plurality of high-frequency signals up to the transmit power level of the first high-frequency signal,
the plurality of signal channels excluding a signal channel through which the first high-frequency signal is passed are provided with a power amplifier having power amplification efficiency optimal with respect to a high-frequency signal passed through the signal channel, and
the common amplifier and the power amplifier are each an EER amplifier for remodulating the phase-modulated signal based on the amplitude-modulated component.

12. The wireless communications device of claim 11, wherein the plurality of high-frequency signals include a high-frequency signal of a modulation system employing a time division multiple access technology and a high-frequency signal of a modulation system employing a code division multiple access technology.

* * * * *

UNITED STATES PATENT AND TRADEMARK OFFICE
CERTIFICATE OF CORRECTION

PATENT NO.      : 7,639,990 B2
APPLICATION NO. : 11/435893
DATED           : December 29, 2009
INVENTOR(S)     : Katsuhiko Morioka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this

Ninth Day of November, 2010

David J. Kappos
*Director of the United States Patent and Trademark Office*